United States Patent [19]
Martin et al.

[11] Patent Number: 5,798,816
[45] Date of Patent: Aug. 25, 1998

[54] MULTISPHERIC CONTACT LENS

[75] Inventors: Richard R. Martin, Westford; Michael Vayntraub, North Andover, both of Mass.

[73] Assignee: Polymer Technology Corporation, Wilmington, Mass.

[21] Appl. No.: 789,475

[22] Filed: Jan. 27, 1997

Related U.S. Application Data

[63] Continuation of Ser. No. 335,627, Nov. 8, 1994, abandoned.
[51] Int. Cl.⁶ .................................................. G02C 7/04
[52] U.S. Cl. ............................................... 351/160 R
[58] Field of Search ............................. 351/161, 160 R, 351/160 H, 174

[56] References Cited

U.S. PATENT DOCUMENTS

| | | | |
|---|---|---|---|
| 2,544,246 | 3/1951 | Butterfield | 88/54.5 |
| 3,937,566 | 2/1976 | Townsley | 351/160 R |
| 4,640,595 | 2/1987 | Volk | 351/161 |
| 4,883,350 | 11/1989 | Muckenhirn | 351/160 R |
| 4,890,913 | 1/1990 | De Carle | 351/161 |
| 5,270,744 | 12/1993 | Portney | 351/161 |

Primary Examiner—Georgia Y. Epps
Assistant Examiner—Jordan M. Schwartz
Attorney, Agent, or Firm—John E. Thomas

[57] ABSTRACT

Multispheric contact lenses have a posterior surface including a central, concave spherical optical zone and at least two concave spherical curves peripheral to the central concave optical zone. The lens includes a fillet convex curve connecting the central zone and the first peripheral curve, and fillet convex curves connecting adjacent peripheral concave curves, wherein each junction of a fillet convex curve with a concave spherical curve is tangential. The lenses have an anterior surface including one or more convex spherical curves.

5 Claims, 1 Drawing Sheet

MULTISPHERIC CONTACT LENS

This is a continuation of application Ser. No. 08/335,627 filed on Nov. 8, 1994, now abandoned.

BACKGROUND OF THE INVENTION

The present invention relates to contact lenses for correcting vision that include multiple spherical curves, especially hard contact lenses formed of a rigid polymeric material.

Many lens designs have been suggested for hard contact lenses, including lenses formed of rigid, gas permeable (RGP) polymeric materials. Generally, the lenses include one or more concave curves on the posterior (back) surface, and one or more convex curves on the anterior (front) surface. Some designs, and especially early designs, were based only on spherical concave curves for the posterior surface, and spherical convex curves for the anterior surface. See, for example, U.S. Pat. No. 2,544,246 (Butterfield). Other designs have incorporated one or more aspheric curves on the posterior or anterior surface. See for example, U.S. Pat. No. 4,883,350 (Muckenhirn). Since the typical cornea is not spherical, the designs with aspheric curves are generally regarded as provided a better, more comfortable fit.

The present invention provides contact lenses based only on spherical curves. Due to the unique design, the contact lenses provided comfortable fit and good visual acuity.

SUMMARY OF THE INVENTION

The invention provides a contact lens comprising a posterior surface and an anterior surface including a plurality of spherical curves. The posterior surface comprises: a central, concave spherical optical zone having a diameter of about 6.0 to 10.0 mm, and at least two concave spherical curves peripheral to the central concave optical zone. The lens includes a fillet spherical convex curve connecting the central zone and the first peripheral curve, and a fillet spherical convex curve connecting the first and second peripheral curves, wherein each junction of a fillet convex curve with a concave spherical curve is tangential. The anterior surface comprises one or more convex spherical curves.

Preferably, the posterior lens includes at least three concave spherical curves peripheral to the central concave optical zone, with each concave spherical curve being connected with a fillet spherical convex curve, and each junction of a fillet convex curve with a concave spherical curve being tangential.

The contact lens provides a better, more comfortable fit than other contact lenses based on spherical curves.

DETAILED DESCRIPTION OF THE INVENTION

Figure 1:
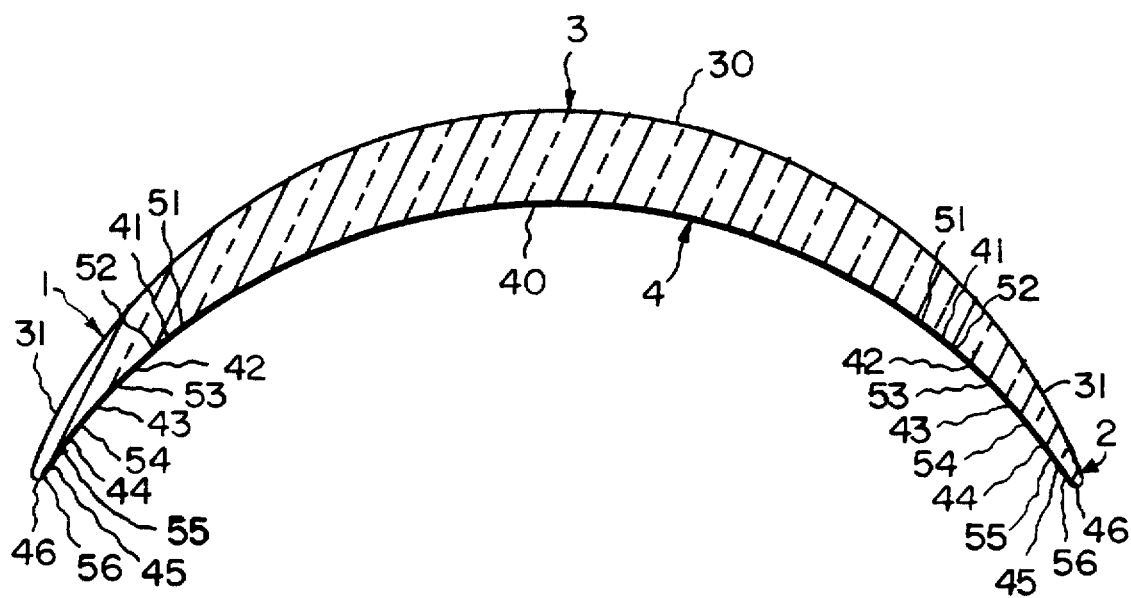
FIG. 1 is an enlarged cross section schematically illustrating a preferred embodiment of the invention.

FIG. 1 schematically illustrates a cross-sectional view of a contact lens 1 according to preferred embodiments of the invention. The lens 1 has an edge 2, an anterior (front) surface 3, and a posterior (back) surface 4. (The lens in FIG. 1 is not drawn to scale in order to illustrate better the relationship of the various curves.)

For the illustrated embodiment, posterior surface 4 has a central, concave spherical optical zone 40 having a diameter of about 6.0 to 10.0 mm, preferably about 7.0 to 8.5 mm. Generally, concave optical zone will have a radius of curvature of about 6.0 to 8.5 mm. At least two major concave spherical curves are peripheral to central concave optical zone 40. For the illustrated embodiment, posterior surface has the following major concave spherical curves peripheral to central, concave optical zone 40: first concave spherical curve 41, second concave spherical curve 42, third concave spherical curve 43, fourth concave spherical curve 44, fifth concave spherical curve 45, and sixth concave spherical curve 46.

Generally, contact lens 1 will have an overall (or outside) diameter in the range of about 8.0 mm to 14.5 mm, preferably about 8.0 mm to 10.5 mm.

Fillet convex curve 51 connects central zone 40 and first peripheral curve 41. Fillet convex curve 52 connects first and second peripheral curves 41,42, and similarly, fillet convex curves 53, 54, 55 and 56 connect adjacent peripheral concave curves.

The fillet curves are minor convex spherical curves placed at the points where the adjoining curves or zones meet. Each junction of a fillet convex curve with an adjoining concave spherical curve is tangential, i.e., the point at which the fillet curve and its adjoining major curve lies is on a tangent common to both curves.

Anterior surface 3 includes one or more convex spherical curves. Generally, the design of anterior surface 3 will be dependent on the design of posterior surface 4. More specifically, the design of anterior surface 3 is chosen so that it is complementary with posterior surface 4. Therefore, in some cases, anterior surface may include only a single spherical convex curve, while in other cases, it may be desirable to include more than one curve to achieve a better fit, such as a more desired edge lift, as can be determined by one skilled in the art. For the illustrated embodiment, anterior surface 3 has a central, convex spherical zone 30, and a convex spherical curve 31 peripheral to central zone 30. If desired, additional peripheral convex curves may be provided on the anterior surface 3.

EXAMPLE 1

A representative lens having a base curve radius of 7.3 mm and an outer diameter of 9.4 mm may be provided with the following posterior curves:

central concave zone 40 having a diameter of 7.6 mm;

first concave spherical curve 41 having a width of 0.0145 mm, and a radius of 7.48 mm;

second concave spherical curve 42 having a width of 0.0125 mm, and a radius of 7.72 mm;

third concave spherical curve 43 having a width of 0.0125 mm, and a radius of 7.91 mm;

fourth concave spherical curve 44 having a width of 0.098 mm, and a radius of 8.29 mm;

fifth concave spherical curve 45 having a width of 0.053 mm, and a radius of 8.54 mm; and sixth concave spherical curve 46 having a width of 0.11 mm, and a radius of 8.93 mm.

fillet convex curve 51 having a width of 0.081 mm and a radius of 51.78 mm;

fillet curve 52 having a width of 0.090 mm and a radius of 20.62 mm;

fillet curve 53 having a width of 0.085 mm and a radius of 54.22 mm;

fillet curve 54 having a width of 0.090 mm and a radius of 7.119 mm;

fillet curve 55 having a width of 0.114 mm and a radius of 69.76 mm; and fillet curve 56 having a width of 0.180 mm and a radius of 75.136 mm.

Lenses with other curves can be provided by one skilled in the art.

It will be appreciated that the invention includes contact lenses having less than, or more than, six major peripheral concave curves on the posterior surface. These other embodiments would include a fillet spherical convex curve connecting adjacent major concave curves, wherein each junction of a fillet convex curve with an adjoining concave spherical curve is tangential.

The contact lenses are preferably hard contact lenses made of a conventional rigid polymeric material, such as polymethylmethacrylate, however, conventional RGP materials, including silicon acrylate or a fluorosilicon acrylate copolymers, are preferred. The materials are provided as lens blanks, or "buttons", and the various curves are lathe cut into the buttons using commercial lathes to form contact lenses having the desired final configuration. As is known in the art, a series of predetermined contact lens designs and the relevant design parameters can be stored electronically for access by the lathe operator to produce a lens within the series having a desired final configuration.

The invention is not limited to the details of the illustrative embodiments. This invention may be embodied in other specific forms without departing from the essential attributes thereof. The present embodiments are therefore to be considered as illustrative and not restrictive.

We claim:

1. A contact lens comprising a posterior surface, an anterior surface and an edge, wherein:

the posterior surface comprises: a central, concave spherical optical zone having a diameter of about 6.0 to 10.0 mm; a first concave spherical curve peripheral to said central concave optical zone; a first fillet convex spherical curve connecting the central zone and the first peripheral curve; a second concave spherical curve peripheral to said first peripheral curve; a second fillet spherical convex curve connecting the first and second peripheral curves; a third concave spherical curve peripheral to said second peripheral curve; and a third fillet spherical convex curve connecting the second and third peripheral curves, wherein each junction of a fillet convex curve with a concave spherical curve is tangential; and the anterior surface comprises one or more convex spherical curves.

2. The contact lens of claim 1, wherein the posterior surface further comprises a fourth concave spherical curve peripheral to said third peripheral curve, and a fillet spherical convex curve connecting the third and fourth peripheral curves.

3. The contact lens of claim 2, wherein the posterior surface further comprises a fifth concave spherical curve peripheral to said fourth peripheral curve, and a fillet spherical convex curve connecting the fourth and fifth peripheral curves.

4. The contact lens of claim 3, wherein the posterior surface further comprises a sixth concave spherical curve peripheral to said fifth peripheral curve, and a fillet spherical convex curve connecting the fifth and sixth peripheral curves.

5. The contact lens of claim 1, wherein all curves of said contact lens are spherical.

* * * * *